Figure 4:
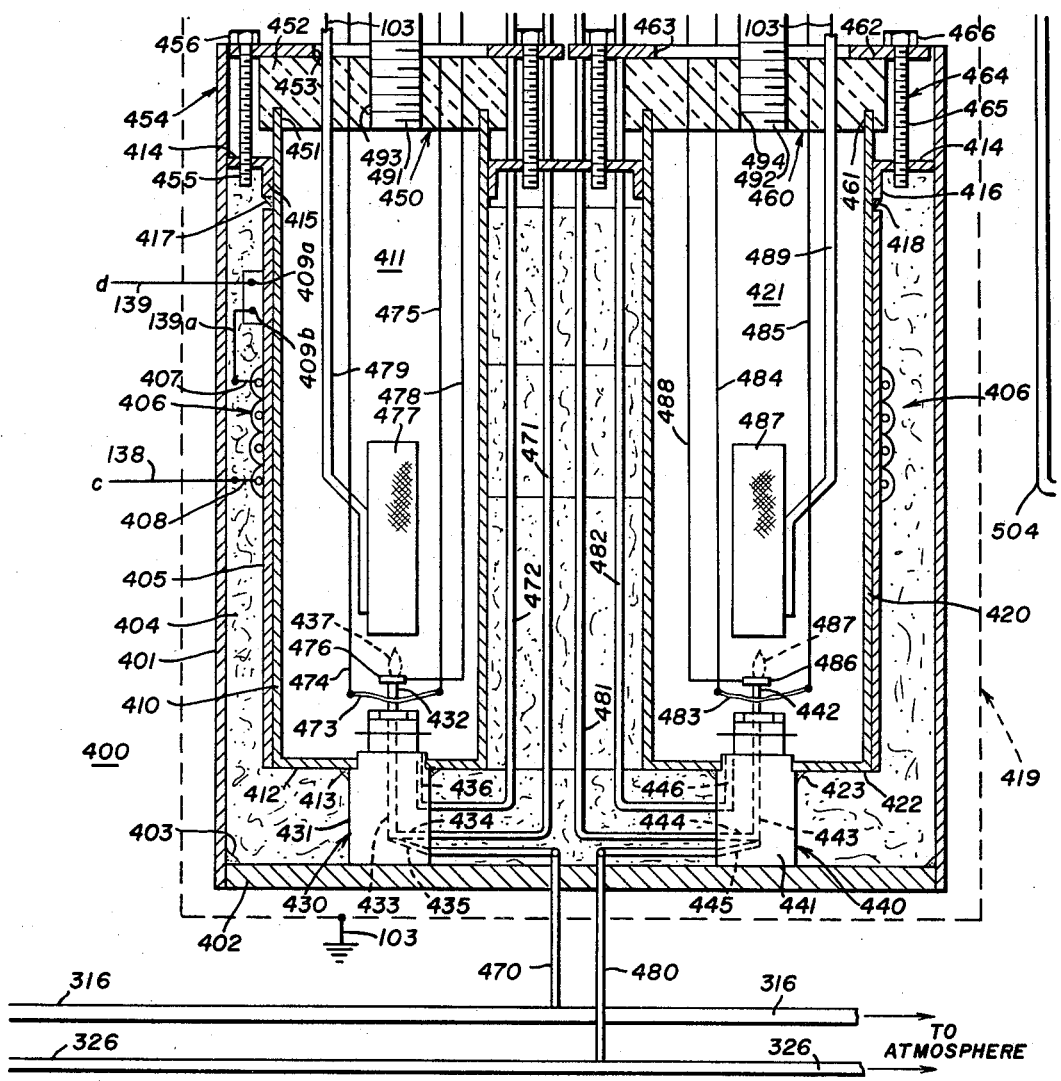

March 3, 1970     J. D. ZEFF ET AL     3,498,294

INHALATION AERSOL DOSIMETER AND METHOD OF MEASURING DOSAGE

Filed Jan. 22, 1964     5 Sheets-Sheet 1

FIG. 1

INVENTORS.
JACK D. ZEFF
MARK W. NORELL

BY Prangley Baird, Clayton,
Miller & Vogel,
         ATTYS.

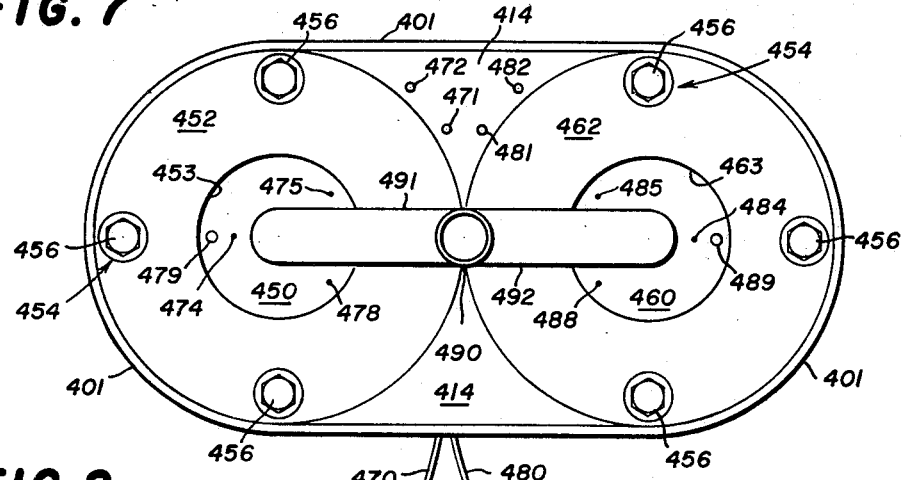
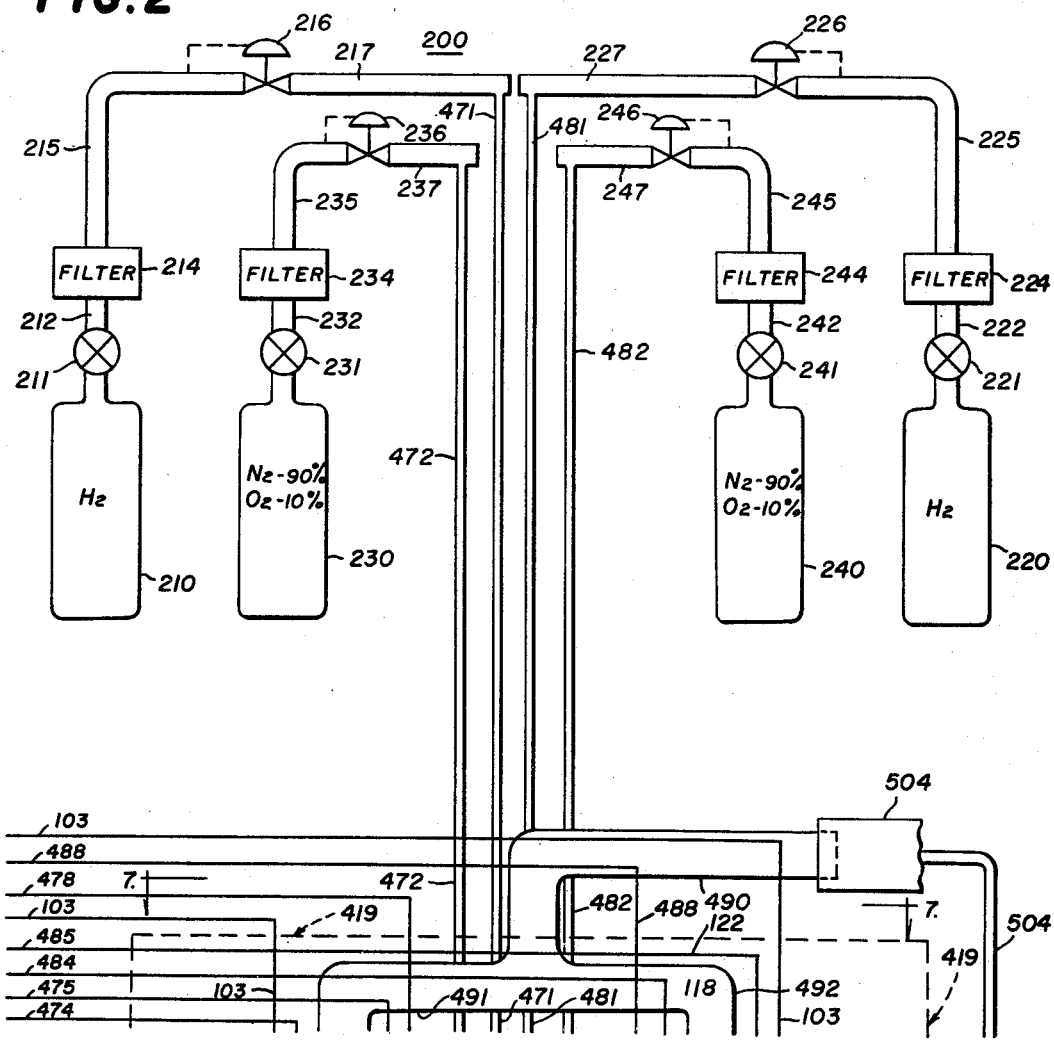

March 3, 1970   J. D. ZEFF ET AL   3,498,294
INHALATION AERSOL DOSIMETER AND METHOD OF MEASURING DOSAGE
Filed Jan. 22, 1964   5 Sheets-Sheet 3

FIG.3

INVENTORS
JACK D. ZEFF
MARK W. NORELL
BY
ATTYS.

INVENTORS
JACK D. ZEFF
MARK W. NORELL
BY
*Pangley Baird Clayton,
Miller & Vogel,*
ATTYS.

March 3, 1970     J. D. ZEFF ET AL     3,498,294
INHALATION AEROSOL DOSIMETER AND METHOD OF MEASURING DOSAGE
Filed Jan. 22, 1964     5 Sheets-Sheet 5

FIG. 5

INVENTORS
JACK D. ZEFF
MARK W. NORELL
BY
ATTYS.

United States Patent Office 3,498,294
Patented Mar. 3, 1970

3,498,294
INHALATION AEROSOL DOSIMETER AND METHOD OF MEASURING DOSAGE
Jack D. Zeff, Highland Park, and Mark W. Norell, Chicago, Ill., assignors to General American Transportation Corporation, Chicago, Ill., a corporation of New York
Filed Jan. 22, 1964, Ser. No. 339,475
Int. Cl. A61m 15/00; G01n 27/62, 29/02
U.S. Cl. 128—185      31 Claims This invention relates to apparatus for continuously and simultaneously measuring and recording the input concentration of an agent in the input gas stream to a processing station and the output concentration of the agent in the output gas stream from the processing station, and more particularly to an inhalation aerosol dosimeter for measuring and recording the amount of the agent retained by the patient, and to the method of continuously and simultaneously measuring and recording the concentrations of the agent in the input gas stream and in the output gas stream and the amount of the agent retained by a patient.

It is to be understood that the apparatus and method of the present invention are applicable generally to the measurement of the concentration of an agent, preferably in aerosol form, in the input gas stream to a processing station and the concentration of the agent in the output gas stream from the processing station; however, the apparatus and method of the present invention are particularly suitable for measuring the amount of aerosol inhaled by and retained by a patient in his respiratory system, and accordingly, the invention will be described as applied thereto. Furthermore, although the apparatus and method of the present invention can be used generally to detect and measure the concentrations of a wide variety of particles in aerosol form, the invention will be described as applied to the detection and measurement of very small quantities of organic materals dispersed in inorganic gases, the organic materials being present in the form of gases, entrained liquids or entrained solid particles, or other suspended form generally classified under the term "aerosol."

The prior apparatus and methods for measuring and recording the quantity of an agent in aerosols retained by a patient within his respiratory system were based upon periodic measurement of the concentration of the agent in the aerosol inhaled in an input gas stream which the patient was allowed to breathe for a certain period of time, and subsequent periodic measurement of the total amount of the agent in the aerosol exhaled by the patient in an output gas stream. When using the prior apparatus and methods, it was impossible to tell during the administration of the aerosol to the patient how much of the agent in the aerosol was retained by the patient since it required fifteen minutes or more to make each analysis. Furthermore, the procedure required a substantial period of time to administer to the patient a predetermined dose of the aerosol, and it was almost impossible to administer to the patient a very precise dose of the aerosol within a reasonable length of time.

Accordingly, it is an important object of the present invention to provide an apparatus and method for continuously and simultaneously measuring the input concentration of an agent, such for example as in aerosol form, in an input gas stream to a processing station or a patient and the output concentration of the agent in the output gas stream from a processing station or a patient.

Another object of the invention is to provide an apparatus of the type set forth which has a response to changes in the concentration of the agent or aerosol content of the gas streams being sampled which is very short and on the order of a fraction of a second so that the apparatus may be used continuously to measure the concentration of the agent or the aerosol content of the gas streams sampled that vary substantially in composition with respect to time.

Yet another object of the invention is to provide in apparatus of the type set forth an improved system for detecting continuously and simultaneously the input concentration of an agent in the input gas stream and the output concentration of the agent in the output gas stream, the detecting system using two matched ionization detectors constructed and arranged to operate with a subatmospheric pressure therein, the pressure being carefully maintained at a predetermined value to minimize the generation of noise and thus increasing the sensitivity of the detectors.

In connection with the foregoing object, another object of the invention is to provide an improved hydrogen flame ionization detector having two combustion chambers mounted within a single casing and provided with heating structure independent of the hydrogen burners in the combustion chambers for maintaining both of the combustion chambers thereof at a predetermined elevated temperature so that organic compounds having high molecular weights can be readily detected thereby.

Still another object of the invention is to provide in a measuring apparatus of the type set forth an improved sampling system so that identical volumes of gas samples under identical pressures are introduced into the two combustion chambers so that the difference between the ionization within the combustion chambers is a function of the difference between the concentrations of the agent in the two gas streams sampled.

Yet another object of the invention is to provide an improved measuring apparatus of the type set forth which is particularly useful in the detection and measurement of very small particles in gases or aerosol; the particles having a particle size of less than about 5 microns in diameter and having concentrations on the order from less than one to 200 or more micrograms of the agent per liter of the gas stream sampled.

Still another object of the invention is to provide an inhalation aerosol dosimeter for accurately measuring the dosage to a patient of the active ingredient in a gas stream inhaled by a patient, the dosimeter having a minimum amount of dead air volume therein so that the concentration of the agent being administered in the inhalation air stream and the concentration of the agent being administered in the exhalation air stream can be accurately and continuously measured.

Yet another object of the invention is to provide an inhalation aerosol dosimeter utilizing hydrogen flame ionization detectors wherein the hydrogen flame is produced by burning the hydrogen gas in a mixture containing about 90% nitrogen by volume and about 10% oxygen by volume so as to minimize the effect of the difference between the gas composition of the inhalation gas stream to one of the detectors and the gas composition of the exhalation gas stream to the other of the detectors.

Still another object of the invention is to provide an inhalation aerosol dosimeter for measuring the dosage of an agent to be administered to a patient and including means for measuring and recording the concentration of the agent in the inhalation air stream, the difference between the concentration of the agent in the inhalation air stream and the exhalation air stream, and the total volume of the inhalation air stream that enters the patient's respiratory system.

A further object of the invention is to provide an improved method for continuously measuring the amount or dosage of an agent retained by a patient from a gas stream inhaled by the patient.

Further features of the invention pertain to the particular arrangement and construction of the apparatus and the particular arrangement of the steps of the methods whereby the above-outlined and additional operating features thereof are attained.

Figure 6:
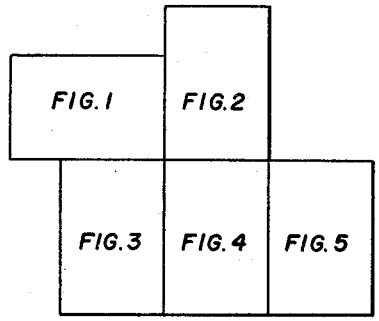

The invention, both as to its organization and method of operation, together with further objects and advantages thereof will best be understood by reference to the following specification when taken in connection with the accompanying drawings, in which:

FIGURES 1 to 5, inclusive, taken together comprise a schematic and diagrammatic representation of an inhalation aerosol dosimeter made in accordance with and embodying the principles of the present invention and adapted for carrying out the method of the present invention, the hydrogen flame ionization detector being illustrated in vertical section;

FIG. 6 illustrates the mode of combining FIGS. 1 to 5, to provide a schematic and diagrammatic representation of the inhalation aerosol dosimeter of the present invention; and FIG. 7 is a view of the top of the detector of FIG. 4 substantially as seen in the direction of the arrows along the line 7—7 thereof.

Referring to FIGS. 1 to 5 of the drawings, there is shown an aerosol inhalation dosimeter made in accordance with and embodying therein the principles of the present invention, the dosimeter including an electrical system generally designated by the numeral 100 and illustratde primarily in FIG. 1, a source 200 of hydrogen gas and an oxygen containing gas for supplying the hydrogen flames in the detectors and illustrated in FIG. 2, a source of aerosol generally designated by the numeral 300 in FIG. 3, a face mask for administering the aerosol to the patient and generally designated by the numeral 320 in FIG. 3, apparatus for measuring the volume of the inhalation air stream and for recording the amount thereof and generally designated by the numeral 340 in FIG. 3, a totalizing circuit indicating the total dosage retained by the patient and generally designated by the numeral 370 in FIG. 3, a hydrogen flame ionization detector generally designated by the numeral 400 in FIG. 4 and including two separate ionizing detecting chambers, and a subatmospheric sampling system generally designated by the numeral 500 in FIG. 5 and connected to the detector 400 accurately to control the pressure within the detecting chambers thereof.

For purposes of illustration, the dosimeter of the present invention will be described when utilized to provide to a patient a predetermined dosage of phenoltetrabromophthalein sulfonate disodium (hereinafter referred to as BSP) having an empirical formula $C_{20}H_8Br_4O_{11}S_2Na_2$ and a molecular weight of about 838. To produce the desired aerosol of BSP in air, the BSP is placed in a dispenser or aerosol generator generally designated by the numeral 301 (see FIG. 3) and provided with electrical connections to the electrical system 100 as will be described more fully hereinafter, the generator 301 being connected by means of a pipe 302 to an aerosol regulator 303. Air, preferably of the "waterpumped" type which contains no traces of hydrocarbon, is provided, such as in the pressure container 304, the outlet of the pressure container 304 being provided with a valve 305 and connected by a pipe 306 to a filter 307, the filter 307 being operative to remove all particulates from the air passing therethrough. The filtered air is fed to the aerosol regulator 303 through a pipe 308, the air and the BSP vapors being mixed in the aerosol regulator 303 to provide a resultant aerosol that is supplied to an outlet pipe therefrom designated 310. The concentration of the BSP in the aerosol within the pipe 310 may be in the range from even less than about 1 to about 200 or more micrograms per liter of air, a particular example being approximately 80 micrograms of BSP per liter of air. The supply pipe 310 connects with a T-coupling 311 which also connects with pipes 313 and 316, the BSP-in-air aerosol within the supply pipe 310 being fed both to the pipe 316 which discharges to the atmosphere and the pipe 313 which carries a stream of the aerosol to the face mask 320.

The face mask 320 is provided with a housing 321 which is adapted to fit upon the face of the patient in covering relationship with respect to the mouth and nose of the patient so that all of the air of aerosol breathed into his respiratory system by the patient comes from the face mask 320 and all of the air or aerosol exhaled from his respiratory system passes into the face mask 320. The housing 321 is connected by means of a flexible section or bellows 322 with a valve 323, the valve 323 being of the dual inhalation-exhalation type and having an inlet port (not shown) connecting with an inhalation or input pipe 324 and an exhalation port (not shown) connecting with an exhalation or output pipe 326, the valve 323 being operable when the patient begins to inhale to open the inlet port thus placing the input stream pipe 324 in communication with the bellows 322 and close to the outlet port of the output pipe 326, and the valve 323 being operable when the patient begins to exhale to close the input port to the input stream pipe 324 and to open the outlet port placing the outlet pipe 326 in communication with the bellows 322. The face mask 320 is very compact and contains a minimum "dead volume" space so that there is a minimum mixing on the inhalation stream and the exhalation stream, i.e., substantially all of the aerosol gas stream that is inhaled enters into the patient's respiratory system and substantially all of the gas stream exhaled passes into the output stream pipe 325. A suitable face mask 320 is that manufactured by the Sierra Madre Engineering Co. (Model No. 450–MBU5P) provided with a valve 323 (Model No. 211–250).

All of that portion of the aerosol stream within the pipe 310 which is drawn off through the pipe 313 to the face mask 320 passes through a flow meter diagrammatically illustrated at 330, the pipe 313 connecting to an inlet conduit 331 for the flow meter 330 and the pipe 324 connecting with an outlet conduit 332 for the flow meter 330, whereby the entire inhalation gas stream entering the face mask 320 passes through the flow meter 330. The flow meter 330 preferably is of the hot-wire-anemoneter type such as that manufactured by the Hastings-Raydist Corp., (Model No. SM–20K). More specifically the flow meter 330 contains a filament which is maintained at about 200° C. by electrical power derived from the electrical system 100, as will be explained more fully hereinafter, the accuracy of the flow meter 330 being independent of the aerosol content of the inhalation gas stream. The output from the flow meter 330 is an electrical signal which is suitably amplified and recorded as will be explained more fully hereinafter.

Both the pipes 316 and 326 exhaust to the atmosphere (see FIG. 4), but before the streams flowing therethrough are exhausted to the atmosphere, samples are withdrawn therefrom and introduced into the dual hydrogen flame ionization detector 400 illustrated in FIG. 4. The detector 400 comprises an outer casing 401 that is generally oval in outline (see FIG. 7) and is arranged in a generally upstanding position as illustrated in FIG. 4 and preferably is formed of Type 316 stainless steel. The lower end of the casing 401 is closed by an oval plate 402 which is suitably secured thereto such as by welding at 403. Disposed within the casing 401 and spaced inwardly therefrom are two upstanding cylindrical housings 410 and 420 which are substantially identical in construction, the housings 410 and 420 being spaced apart and each having a length slightly less than that of the casing 401 and a diameter such that both can easily fit within the casing 401, the housings 410 and 420 being also preferably formed of Type 316 stainless steel and each defining therein a combustion chamber, the housing 410 providing a combustion chamber 411 and the housing 420 providing a combustion chamber 421.

The housing 410 forms a part of a first ionization detector and to this end there is provided integral with the lower end of the housing 410 an inturned bottom wall 412 having an opening generally centrally thereof to receive therethrough the upper end of an hydrogen flame ionization burner generally designated by the numeral 430. The burner 430 includes a metal body 431 which is secured to the bottom wall 412 as by soldering at 413 with silver solder to provide a good thermal contact between the burner body 431 and the bottom wall 412 of the housing 410. Mounted on the top of the body 431 is a burner tip 432 which is electrically insulated therefrom and provided with a gas passage therein communicating with a substantially vertically arranged gas passage 433 within the body 431. There further is provided in the body 431 a first lateral passage 434 for connection to a source of hydrogen gas and a second lateral passage 435 for connection to a source of the gas to be sampled and analyzed, the lateral passages 434 and 435 connecting with each other within the body 431 and in turn connecting with the vertical passage 433 therein.

Yet another passage 436 is provided in the body 431 and is adapted to be connected to a source of oxygen containing gas to support combustion of hydrogen gas introduced through the passage 434, the passage 436 emerging into the chamber 411 at a point spaced from the burner jet 432. The mixture of hydrogen gas and oxygen containing gas within the chamber 411 when ignited burns to produce an ionizing flame designated by the numeral 437, the burner jet 432 being formed of a good heat conducting metal and being placed in good thermal contact with but electrically insulated from the body 431 which is in turn in good thermal contact with the housing 410 so that the burner jet 432 is maintained at a temperature sufficiently low so that there is substantially no thermal electron emission therefrom.

The housing 420 forms a part of a second ionization detector and to this end there is provided integral with the lower end of the housing 420 an inturned bottom wall 422 having an opening generally centrally thereof to receive therethrough the upper end of the hydrogen flame ionization burner generally designated by the numeral 440. The burner 440 includes a metal body 441 which is secured to the bottom wall 422 such as by soldering at 423 with silver solder to provide good thermal contact between the burner body 441 and the bottom wall 422 of the housing 420. Mounted on the top of the body 441 is a burner tip 442 which is electrically insulated therefrom and provided with a gas passage therein communicating with a substantially vertically arranged gas passage 443 within the body 441. There further is provided in the body 441 a first lateral passage 444 for connection to a source of hydrogen gas and a second lateral passage 445 for connection to a source of the gas to be sampled and analyzed, the lateral passages 444 and 445 connecting with each other within the body 441 and in turn connecting with the vertical passage 443 therein.

Yet another passage 446 is provided in the body 441 and is adapted to be connected to a source of oxygen containing gas to support combustion of hydrogen gas introduced through the passage 444, the passage 446 emerging into the chamber 421 at a point spaced from the burner jet 442. The mixture of hydrogen gas and oxygen containing gas within the chamber 421 when ignited burns to produce an ionizing flame designated by the numeral 447, the burner jet 442 being formed of a good heat conducting metal and being placed in good thermal contact with but electrically insulated from the body 441 which is in turn in good thermal contact with the housing 420 so that the burner jet 442 is maintained at a temperature sufficiently low so that there is substantially no thermal electron emission therefrom.

The upper ends of the housings 410 and 420 are respectively closed by heat resistant covers 450 and 460, each of the covers 450 and 460 being generally circular in shape and having an internal diameter greater than the external diameter of the associated housings 410 and 420, respectively, and further having a diameter such that both of the covers 450 and 460 can fit within the outer casing 401. Preferably the covers 450 and 460 are formed of a synthetic organic resin having good stability at high temperature, a suitable material of construction being tetrafluoroethylene polymers, which material is not only heat resistant but in addition has good heat insulating properties and good electrical insulating properties.

The underside of the cover 450 has an annular slot 451 therein disposed concentrically therewith and receiving the upper edge of the housing 410 therein, so as to close and to seal the upper end of the housing 410; the underside of the cover 460 likewise has an annular slot 461 therein disposed concentrically therewith and receiving the upper edge of the housing 420 thereinto so as to close and to seal the upper end of the housing 420. Structure is provided removably to mount the covers 450 and 460, respectively, on the upper ends of the housings 410 and 420 and to this end an oval bracket 414 is provided having an exterior periphery shaped complementary to that of the interior of the casing 401 and having a first circular opening therein for receiving therethrough the upper end of the casing 410 and having a second opening therein for receiving therethrough the upper end of the casing 420, the first opening having a cylindrical downwardly extending flange 415 integral with the periphery thereof and surrounding the outer surface of the housing 420 adjacent to the upper end thereof and suitably secured thereto such as by welding along the line 417, the second opening having a cylindrical downwardly extending flange 416 integral with the periphery thereof and surrounding the outer surface of the housing 420 adjacent to the upper end thereof and suitably secured thereto such as by welding along the line 418; a plurality of threaded openings is provided in the bracket 414 for receiving threaded fasteners therein.

The cover 450 is further provided with an annular ring 452 resting upon the upper surface thereof, the outer periphery of the ring 452 being circular in shape and having a diameter slightly greater than the external diameter of the cover 450 and yet fitting within the casing 401 so as to be freely movable vertically with respect thereto; the ring 452 further extends inwardly to overlie the outer portions of the upper surface of the cover 450 inwardly of the annular slot 451 and is provided with a circular opening 453 centrally thereof. There further is provided in the ring 452 a plurality of circular openings which receive therethrough bolts 454 each including a threaded shank 455 which passes through the associated opening in the ring 452 and threadedly engages in an associated threaded opening in the bracket 414, the upper ends of the bolts 454 being provided with heads 456 which bear against the upper surface of the ring 452. By threading the bolts 454 downwardly into the bracket 414, the heads 456 thereof are moved downwardly against the upper surface of the ring 452 which in turn bears downwardly on the upper surface of the cover 450 to press the cover 450 into closing and sealing relationship with the upper end of the housing 410 so as effectively to close and to seal the upper end of the combustion chamber 411.

The cover 460 is further provided with an annular ring 462 resting upon the upper surface thereof, the outer periphery of the ring 462 being circular in shape and having a diamond slightly greater than the external diameter of the cover 460 and yet fitting within the casing 401 so as to be freely movable vertically with respect thereto; the ring 462 further extends inwardly to overlie the outer portions of the upper surface of the cover 460 inwardly of the annular slot 461 and is provided with a circular opening 463 centrally thereof. There further is provided in the ring 462 a plurality of circular openings which receive therethrough bolts 464 each including a threaded shank 465 which passes through the associated opening in the ring 462 and threadedly engages in an associated threaded opening in the bracket 414, the upper ends of the bolts 464 being provided with heads 466 which bear against the upper surface of the ring 462. By threading the bolts 464 downwardly into the bracket 414, the heads 466 thereof are moved downwardly against the upper surface of the ring 462 which in turn bears downwardly on the upper surface of the cover 460 to press the cover 460 into closing and sealing relationship with the upper end of the housing 420 so as effectively to close and to seal the upper end of the combustion chamber 421.

Suitable piping structure is provided to carry hydrogen gas, oxygen containing gas, and a gas containing the sample to be analyzed into the burners 430 and 440 and to withdraw the resultant as mixture from the combustion chambers 411 and 421. To this end a first capillary tube 470 is provided which extends inwardly through the outer casing 401 beneath the lower housing wall 412 and has one end thereof connected with the passage 435 in the burner body 431 so as to introduce a gas sample thereinto and has the other end thereof connected to the pipe 316 which carries the aerosol mixture having the same composition as the stream inhaled by the patient via the flow meter 330, the valve 323 and the face mask 320. The capillary tube 470, for example, has an internal diameter of 0.020" and a length of 6", the pipe 316 has, for example, an internal diameter of the order of an inch. A second capillary tube 480 is provided which also extends inwardly through the outer casing 401 and beneath the lower housing 422 and has one end thereof connected with the passage 445 in the burner body 441 so as to introduce a gas sample thereinto and has the other end thereof connected to the pipe 326 which carries the exhaled gas stream from the face mask 320 to the atmosphere. The capillary tube 480, for example, has an internal diameter of 0.020" and a length of 6" and the pipe 326 has, for example, an internal diameter of the order of an inch.

The system for supplying hydrogen gas and an oxygen containing gas to the dual detector 400 is illustrated in FIG. 2 of the drawings and includes suitable sources of hydrogen gas of chromatographic grade in the form of containers 210 and 220, the containers 210 and 220 being provided with outlet valves 211 and 221, respectively, that are connected by piping 212 and 222 to filters 214 and 224, respectively, the filters from the hydrogen gas streams passing therethrough. The outlet connections of the filters 214 and 224 are connected respectively to pipes 215 and 225 which in turn connect respectively to the inlet connection for control valves 216 and 226, the control valves 216 and 226 having the outlet connections thereof in communication respectively with supply pipes 217 and 227 wherein the hydrogen gas pressure is approximately 5 lbs. per square inch. A first capillary tube 471 is provided and has one end thereof connected with the passage 434 in the burner body 431, the capillary tube 471 extending upwardly through the bracket 414 and out of the detector 400 and having the other end thereof connected to the supply pipe 217. The capillary tube 471, for example, has an internal diameter of 0.006" and a length of 24" whereas the supply pipe 217 has an internal diameter of the order of ¼". A second capillary tube 481 is provided and has one end thereof connected with the passage 444 in the burner body 441, the capillary tube 481 extending upwardly through the bracket 414 and out of the detector 400 and having the other end thereof connected to the supply pipe 227. The capillary tube 481, for example, has an internal diameter of 0.006" and a length of 24" whereas the supply pipe 227 has an internal diameter of the order of ¼".

A source of oxygen containing gas is also provided as illustrated in FIG. 2 in the form of two containers 230 and 240, the preferred oxygen containing gas being a mixture of gases containing about 90% by volume of nitrogen and about 10% by volume of oxygen; it has been found that the use of this mixture of gases as the oxygen containing gas to support the combustion of the hydrogen gas substantially eliminates any errors in detecting the aerosol content in the streams of the pipes 316 and 326 that might be introduced thereinto because of the different oxygen and carbon dioxide contents of the gases in the gas streams contained therein. The outlet connections of the containers 230 and 240 are connected respectively to control valves 231 and 241 which in turn are connected respectively by pipes 232 and 242 to the inlet connections for the filters 234 and 244, the filters 234 and 244 being effective to remove all particulates from the gas streams passing therethrough. The outlet connections of the filters 234 and 244 are connected respectively by pipes 235 and 245 to pressure regulator valves 236 and 246, respectively, and particularly to the inlet connections thereto, the outlet connections from the valves 236 and 246 being connected respectively to supply pipes 237 and 247. The regulator valves 236 and 246 are operable to maintain the gas pressure at approximately 10 lbs. p.s.i. within the supply pipes 237 and 247. The oxygen containing gases in the containers 230 and 240 are preferably of the "water pumped" type containing no traces of hydrocarbons whatsoever. Connections between the sources of the oxygen containing gases and the duel detector 400 are provided; more particularly, a first capillary tube 472 is provided having one end connected to the passage 436 in the burner body 431, the capillary tube 472 extending upwardly outside of the housing 410 and through the bracket 414 and having the other end thereof connected to the supply pipe 237; a second capillary tube 482 is provided having one end thereof connected to the passage 446 in the burner body 441 and extending upwardly through the bracket 414 and having the other end thereof connected to the supply pipe 247. The capillary tubes 472 and 482, for example, each has an internal diameter of 0.10" and a length of 24", whereas the supply pipes 237 and 247 have internal diameters on the order of ¼".

Finally, an outlet is provided for both of the chambers 411 and 421 by a pipe 490 in the form of a Y-connection having a first leg 491 having the lower end thereof threaded as at 493 for engaging in a threaded opening disposed centrally of the cover 450 and having a second leg 492 having the lower end thereof threaded as at 494 for engaging in a threaded opening disposed centrally of the cover 460. The internal diameter of the pipe 490 including the legs 491 and 492 is, for example, ½", and the outlet of the pipe 490 is connected to the sampling and vacuum system 500 of FIG. 5.

There further is provided within the combustion chamber 411 an igniter wire 473 which is preferably formed of platinum and is connected to and supported by a pair of conductors 474 and 475 which extend upwardly through the combustion chamber 411 and outwardly through suitable openings in the cover 450 for connection to the electrical system 100 as will be explained more fully hereinafter. Means also is provided within the combustion chamber 411 to detect the ionization of the gases within the flame 437 and including a first annular electrode 476 and a second annular electrode 477. The first electrode 476 is disposed about the base of the flame 437 and is supported by the burner tip 432 and mechanically mounted thereon, an electrical connection to the electrode 476 being made by a conductor 478 which extends upwardly through the chamber 411 and out through an opening in the cover 450 for connection to the electrical system 100. The second electrode 477 is in the form of an annular and cylindrical screen which is preferably formed of stainless steel and gold plated to provide an 84-mesh screen which is spaced slightly above the upper end of the flame 437 and disposed concentrically with respect thereto, the vertical extent of the annular screen electrode 477 being substantial and on the order of about two inches. The electrode 477 is supported by and electrically connected to a rod 479 which extends upwardly through the combustion chamber 411 and through a hole in the cover 450 for connection also to the electrical system 100.

There further is provided within the combustion chamber 421 an igniter wire 483 which is preferably formed of platinum and connected to and supported by a pair of conductors 484 and 485 which extend upwardly through the combustion chamber 421 and outwardly through suitable openings in the cover 460 for connection to the electrical system 100. Means also is provided within the combustion chamber 421 to detect the ionization of gases within the flame 447 and including a first annular electrode 486 and a second annular electrode 487. The first electrode 486 is disposed about the base of the flame 447 and is supported by the burner tip 442 and mechanically mounted thereon, an electrical connection to the electrode 486 being made by a conductor 488 which extends upwardly through the chamber 421 and out through an opening in the cover 460 for connection to the electrical system 100. The second electrode 487 is in the form of an annular and cylindrical screen and is preferably formed of stainless steel and gold plated to provide an 84-mesh screen which is spaced slightly above the upper end of the flame 447 and disposed concentrically with respect thereto, the vertical extent of the electrode 487 being substantial and on the order of about two inches. The electrode 487 is supported by and electrically connected to a rod 489 which extends upwardly through the combustion chamber 421 and through a hole in the cover 460 for connection also to the electrical system 100.

It is to be understood that the holes in the cover 450 which receive the conductors 474, 475, 478 and 479 therethrough form a gas-tight connection therearound and the material of the cover 450 also electrically insulates the conductors one from another. Likewise, it is to be understood that the holes in the cover 460 that receive the conductors 484, 485, 488 and 489 therethrough form a gas-tight connection therearound and the material of the cover 460 also electrically insulates the conductors one from another.

It has been found that the dual detector 400 has an increased sensitivity resulting from a reduced noise level in the individual detectors thereof when the temperatures within the combustion chambers 411 and 421 are carefully controlled and regulated, and it further has been found advantageous to maintain the temperatures of the combustion chambers 411 and 421 well above room temperature when the detector 400 is used to measure the concentration of organic materials having a high molecular weight, such as BSP, so as to minimize the condensation and the accumulation of the organic material within the combustion chambers 411 and 421, any condensation and accumulation of the organic material eventually providing incorrect concentration signals from the detector 400. Maintaining the temperature of the combustion chambers 411 and 421 substantially constant throughout the operation of the detector 400 is first of all facilitated by providing a quantity of insulating material 404 disposed about the sides of the housings 410 and 420 and around the lower ends thereof and below the bracket 414, the insulating material 404 being of any suitable character but preferably being glass fibers substantially filling the voids below the bracket 414 as illustrated in FIG. 4.

The temperatures within the combustion chambers 411 and 421 must further be maintained substantially constant with respect to each other and to this end a metal sheet 405 is wrapped around the outer portions of both of the housings 410 and 420, the sheet 405 being formed of a good heat conducting material such as brass and extending from the buttons of the housings 410 and 420 upwardly to the lower ends of the flanges 415 and 416. Heating structure independent of the burners 430 and 440 is also provided to heat the combustion chambers 411 and 412, if necessary, the heating structure being an electric heater 406 disposed about the metal sheet 405 substantially midway between the upper and lower ends of the housings 410 and 420, the heater 406 being in the form of a tape heater wrapped around the outer surface of the sheet 405 and provided with a pair of electrical connections 407 and 408 suitably connected to the electrical system 100 as will be described more fully hereinafter.

There further is provided on the exterior of the sheet 405 a thermostat 409 in thermal contact therewith to sense the temperature thereof and having a pair of output terminals 409a and 409b suitably connected in the electrical circuit 100.

The sampling system 500 of FIG. 5 is provided to supply a constant and accurately predetermined pressure within both the combustion chamber 411 and the combustion chamber 421 so as to provide an identical operating pressure therein. The provision of the same operating pressure within the combustion chambers 411 and 421 insures that a constant rate of flow of gases is provided into both of the chambers, and more specifically constant controlled rates of flow of hydrogen gas into the combustion chambers 411 and 421 are insured and constant and accurate rates of flow of the sampled gases into the combustion chambers 411 and 421 are insured. The constant and identical rates of flow of gases into the combustion chambers 411 and 421 produces identical operation thereof so that identical concentrations of particulates in the sampled gas streams thereinto provide equal ionization currents in the ionizing flames 437 and 447, and further accurate control of the flow of hydrogen gas into the combustion chambers minimizes fluctuations of the flames 437 and 447 and thus reduces the background noise in the detectors and increases the sensitivity thereof. The pipe 490 connecting via the legs 491 and 492 with the combustion chambers 411 and 421 has the outlet thereof connected directly to the inlet of the sampling system 500 and all of the gases passing through the combustion chambers 411 and 421 are withdrawn into the sampling system 500 so as to maintain the pressure within both the combustion chambers 411 and 421 at a predetermined value below atmospheric pressure, such as for example, at a pressure corresponding to 6" of water below atmospheric pressure, or any other desired value between a fraction of an inch and up to 18" of water or more below atmospheric pressure.

The sampling system 500 includes a first housing or tank 501 defining a cooling chamber 502 which is closed and has a volume several times the combined volume of the combustion chambers 411 and 421, for example, the cooling chamber 502 having a volume approximately eight times the combined volume of the combustion chambers 411 and 421. An inlet connection in the form of a pipe 503 having a substantial internal diameter on the order of ¼" is provided for the housing 502; the pipe 503 extends a substantial distance downwardly into the cooling chamber 102 and has an upper end thereof connected by piping 504 to the outlet pipe 490 for the combustion chambers 411 and 421, the piping 504 being preferably formed of synthetic organic plastic in the form of a tube having an internal diameter of about ⅜", the preferred material of construction being tetrafluoroethylene polymers, whereby the cooling chamber 502 is directly connected to and in communication with the combustion chambers 411 and 421 via the outlet pipe 490, the piping 504 and the inlet pipe 403. Disposed within the cooling chamber 502 is a coil 505 which is adapted to receive cold water in one end thereof as at 506 so as to cool the coil 505 and connected at the outlet end 507 thereof to a drain or other suitable point of disposal of the cooling water issuing therefrom. The coil 505 is preferably supplied with tap water having a temperature in the range 60° F. to 75° F., and accordingly, is capable of condensing water vapor and other like gases which enter the cooling chamber 502 from the combustion chambers 411 and 421, whereby to remove such condensable gases from the gas stream thereinto so as to eliminate the clogging of subsequent components of the sampling system by condensed gases and to relieve the load on the pumping structure for the system 500. An outlet drain 508 provided with a suitable control valve 508a is connected in the bottom of the chamber 502 for draining the condensed water and other liquids therefrom. The gases not condensed within the cooling chamber 502 are withdrawn therefrom through an outlet connection 509 disposed in the upper end thereof.

There further is provided a pressure indicating gauge 510 having a connection 510a communicating with the upper end of the cooling chamber 502, the gauge 510 being capable of measuring subatmospheric pressures from a fraction of an inch of water up to 18 inches of water or more; more specifically, the gauge 110 is preferably of the magnehelic vacuum gauge type which has the dial thereof directly calibrated in inches of water, the gauge 510 indirectly indicating the vacuum within the combustion chambers 411 and 421 since the outlet pipe 490 and the inlet connection 503 have substantial internal diameters on the order of 3/8" to 1/2" and the tube 504 has an internal diameter of 3/8", whereby the pressure within the combustion chambers 411 and 421 is identical and is the same as that within the cooling chamber 502.

The cooling chamber 502 is directly connected to another housing 511 defining a ballast chamber 512 and having an inlet conduit 513 and an outlet conduit 514, the inlet conduit 513 being connected directly by piping 515 to the outlet connection 509 for the cooling chamber 502, the inlet conduit 513 and the piping 515 having substantial internal diameters on the order of 1/4" or greater. The ballast chamber 512 serves as an isolation or ballast tank and is effective to absorb or dampen variations in the pressure between the components disposed on either side thereof of the sampling system 500; the ballast chamber 512 preferably has a volume of substantially the same order of magnitude as the cooling chamber 502, so as to maintain the pressure within the combustion chambers 411 and 421 and the cooling chamber 502 substantially constant and free of fluctuations.

The rate of flow of the gases issuing from the ballast chamber 512 is measured by a flowmeter 520 having an inlet tube 521 and an outlet tube 522, the inlet tube 521 being connected by piping 523 to the outlet conduit 514 of the ballast chamber 512 so that all of the gases passing through the ballast chamber 512 pass through the flow meter 520, whereby the rate of flow thereof can be measured.

The gases issuing from the flow meter 520 through the outlet tube 522 therefrom are conducted into a housing 531 defining a low vacuum chamber 532, the low vacuum chamber 532 having a volume of the same order of magnitude as the cooling chamber 502 and the ballast chamber 512. A first inlet passage in the form of a pipe 533 is provided communicating with the low vacuum chamber 532 and extending downwardly to a point spaced a short distance from the bottom thereof, the upper end of the pipe 533 being connected by the piping 532 to the outlet tube 522 of the flow meter 520. An outlet passage in the form of a pipe 535 is provided for the low vacuum chamber 532 to withdrawn all of the gases therein therefrom.

A capillary tube generally designated by the numeral 540 is provided and has one end thereof connected by piping 541 to the outlet pipe 535 from the low vacuum chamber 532. The capillary tube 540 preferably has an internal diameter on the order of 0.01" and a length of about 4" and serves to isolate the low vacuum chamber 532 from the succeeding stages.

Another housing 551 is provided defining therein a high vacuum chamber 552, the high vacuum chamber 552 being provided at the bottom thereof with an inlet pipe 553 connected by piping 542 to the outlet of the capillary tube 540. The volume of the high vacuum chamber 552 is of the same order of magnitude as the volume of the cooling chamber 502, the ballast chamber 512 and the low vacuum chamber 532. The upper end of the high vacuum chamber 552 is provided with an outlet pipe 554 which is connected by the piping 555 to a high capacity vacuum pump generally designated by the numeral 560. The pump 560 includes a gas intake 561 connected to the piping 555 and a gas exhaust 562, the pump 560 being preferably operated by an electrical motor having electrical power input connections 563 and 564 that are suitably connected to the electrical system 100 as will be described more fully hereinafter. Operation of the vacuum pump 560 serves to maintain the pressure within the high vacuum chamber 552 substantially below atmospheric pressure, and for example, at a pressure corresponding to a vacuum in the range from about 100 mm. to about 200 mm. of mercury. As a result of the high vacuum within the high vacuum chamber 552, the low vacuum chamber 532 will be maintained at a subatmospheric pressure in the range from a few inches of water to about 30 inches of water below atmospheric pressure, whereby to maintain the combustion chambers 411 and 421 and the cooling chamber 502 and the ballast chamber 512 at the above indicated pressure of a few inches of water to about 18 inches of water or more below atmospheric pressure, a preferred operating pressure being a pressure corresponding to 6 inches of water below atmospheric pressure.

The low vacuum chamber 532 has a second inlet passage in the form of a pipe 537 in the upper end thereof, the upper end of the pipe 537 being connected by the piping 538 to a precision vacuum regulator 570, the regulator 570 being, for example, of the type commercially available from Moore Products Co. (Model No. 44); more specifically, the regulator 570 includes an outlet connection 570 connected to the piping 538 and an inlet connection 572. Connection is made from the inlet connection 572 to a source of compressed air (not shown) via piping 573, an air filter 574 and piping 575. The valve 570 is of the type which is adapted to pass compressed air therethrough from the inlet connection 572 to the outlet connection 571 upon demand to maintain a predetermined pressure in the outlet connection 571, thus to maintain the pressure within the low vacuum chamber 532 at the predetermined pressure set by the vacuum regulator 570, the vacuum regulator 570 reducing or stopping the passage of air therethrough when the pressure within the low vacuum chamber 532 and within the outlet connection 571 approaches or exceeds that set by the vacuum regulator 510, and the vacuum regulator 570 passing more air therethrough when the pressure within the low vacuum chamber 532 and consequently the pressure in the outlet connection 571 falls below the predetermined pressure set by the vacuum regulator 570.

Electrical power for operating and controlling the inhalation aerosol dosimeter and particularly the power supplied to the electrical system 100 therefor is derived from the usual three-wire Edison source of 115 volt, 60 cycle, A.C. More specifically, the source comprises a pair of main conductors 101 and 102 and a grounded third conductor 103, the conductors 101 and 102 being connected through fuses 104, respectively, to conductors 105 and 106 which in turn are connected to one of the terminals of main line switches 107 and 108, respectively. The other of the terminals of the main line switches 107 and 108 are connected to conductors 109 and 110, respectively. The conductors 109 and 110 are connected directly to the power terminals 563 and 564, respectively, of the motor for the vacuum pump 560 so as to provide motive power therefor immediately upon the closure of the main line switches 107 and 108. The conductors 109 and 110 are also connected as the input to a first transformer 111 including a primary winding 112 and a secondary winding 113, the conductors 109 and 110 being connected to the input terminals 114 and 115, respectively, of the primary winding 112. The secondary winding 113 has output terminals 116 and 117 that are connected to conductors 118 and 119, respectively. The conductor 118 is connected to one end of the igniter wire 473 in the combustion chamber 411 (see FIG. 4) and is also connected to one end of the igniter wire 483 in the combustion chamber 421. The conductor 119 is connected to one terminal of a start switch 120 and also to one terminal of a start switch 121, the other terminal of the start switch 120 being connected by a conductor 122 to the other terminal of the igniter wire 483 in the combustion chamber 421 and the other terminal of the start switch 120 being connected by a conductor 123 to the other terminal of the igniter wire 473 in the combustion chamber 411. Upon closure of the main line switches 107 and 108, there is induced in the secondary winding 113 of the transformer 111 the necessary voltage for operation of the igniter wires 473 and 483, for example, 2.5 volts A.C. being developed between the output terminals 116 and 117 thereof, which voltage when applied to the igniter wires 473 and 483 upon closure of the start switches 120 and 121, respectively, serves to heat the igniter wires to a temperature such that a mixture of hydrogen gas and oxygen containing gas flowing thereacross is ignited thereby.

The conductors 109 and 110 are further connected to a transformer 130 having a primary winding 131 and a secondary winding 132, the primary winding 131 having input terminals 133 and 134 connected respectively to the conductors 109 and 110. The transformer 130 is of the movable core type and includes a movable core 135 which is shiftable to provide variable coupling between the primary winding 131 and the secondary winding 132 so as to provide various desired output voltages in the secondary winding 132, the secondary winding 132 having output terminals 136 and 137 which are connected to conductors 138 and 139, respectively. The conductor 138 is further connected to the input terminal 408 of the electric heater 406 in the detector 400 (see FIG. 4), and the conductor 139 is connected to the input terminal 409a of the thermostat 409. The other terminal 407 of the electric heater 406 is connected by a conductor 139a to the other terminal 409b of the thermostat 409. When the main line switches 107 and 108 are closed, the transformer 130 has a voltage output on the output terminals 136 and 137 thereof which is applied to a circuit which can be traced from the conductor 138 connected to the terminal 408 through the heater 406 to the other terminal 407 thereof, via the conductor 140 to the terminal 409b and through the thermostat 409 to the other terminal 409a thereof to the conductor 139, whereby the potential developed between the conductors 138 and 139 is connected across the heater 406 and the thermostat 409 in series with each other. The amount of current supplied to the heater 406 is controlled both by the position of the core 135 in the transformer 130 and the operation of the thermostat 409, the position of the core 135 being manually adjustable so as approximately to set the temperature of operation of the heater 406 and the thermostat 409 being automatically operable to make and to interrupt the electrical circuit for the heater 406 so as to control closely the temperature within both the combustion chamber 411 and the combustion chamber 421.

The conductors 109 and 110 are further connected to the input terminals 301a and 301b of the generator 301 to provide the necessary energy to operate the generator 301 upon the closure of the main line switches 107 and 108. The conductors 109 and 110 are also connected to the input terminals 333 and 334 of the flow meter 330 and more specifically to heat the electrical filament therein. The output from the flow meter 330 appears on a pair of output terminals 335 and 336 which are connected respectively by conductors 337 and 338 to the inhalation air stream volume circuit generally designated by the numeral 340 in FIG. 3. More specifically, the conductors 337 and 338 are connected to an amplifier 341 and specifically to the input terminals 342 and 343 thereof, respectively, a second input to the amplifier 341 being from the main conductors 109 and 110 which connect respectively to input terminals 344 and 345 thereof. The output from the amplifier 341 is an electrical signal which is a function of the volume of the inhaled gas stream passing through the flow meter 330, this electrical signal appearing on output terminals 346 and 347 of the amplifier 341.

The output from the amplifier 341 appearing on the output terminals 346 and 347 thereof is connected by means of conductors 348 and 349 respectively to the input of an air inhaled recorder 350 which is adapted to make a record of the air inhaled by the patient through the flow meter 330, the conductors 348 and 349 being connected, respectively to input terminals 351 and 352 of the recorder 350. Another input to the recorder 350 is from the main line conductors 109 and 110 which are connected to input terminals 353 and 354, respectively for supplying operating potential thereto.

In addition to making a continuous record of the air inhaled as measured by the flow meter 330, the recorder 350 provides as an output therefrom a synchronization signal which appears on output terminals 355 and 356 which are connected, respectively to conductors 357 and 358 which convey the synchronization signals to the other parts of the electrical system as required.

The electrical signal from the amplifier 341 is also connected to an air inhaled integrator 360, and more specifically, the conductors 348 and 349 are connected to input terminals 361 and 362, respectively, of the integrator 360 serving to integrate the electrical signals applied thereto with respect to time and to provide an output on output terminals 363 and 364. The output terminals 363 and 364 are connected by conductors 365 and 366, respectively, to the input of a digital air inhaled counter 367 and more specifically to the input terminals 368 and 369 thereof. A second input to the integrator 360 and the counter 367 is from the main line conductors 109 and 110 which provide operating power therefor.

An agent inhaled electrometer 140 is provided having input terminals 141 and 142 respectively connected to the main conductors 109 and 110. The electrometer 140 further comprises terminals 143 and 144 which are connected to the electrodes in the combustion chamber 411, the terminal 143 being connected by the grounded conductor 103 to the conductor 479 connected to the screen electrode 477 and the other terminal 144 being connected by the conductor 478 to the ring electrode 476, the output terminal 144 having a negative 300 volt D.C. potential therein which is derived from a high voltage battery within the electrometer 140 and is applied to the ring electrode 476. The electrometer 140 may be, for example, that sold by Research Specialties Co. (Model No. 605–3) which can detect very small current flows between the ring electrode 476 and the screen electrode 477 caused by the ionization of gases and other materials passing through the hydrogen flame 437, the electrometer 140 being capable of detecting currents on the order of $10^{-14}$ ampere, and having a response time of a fraction of a second.

The ionization current detected between the electrodes 476 and 477 is amplified within the electrometer 140 and an output electrical signal that is a function of the ionization current within the combustion chamber 411 appears as an output on the terminals 146 and 147 which are connected to conductors 148 and 149, respectively, that convey the output signal to other components of the system. The conductors 148 and 149 are connected to an agent inhaled recorder 150, and more specifically, to the input terminals 151 and 152 thereof respectively, the recorder 150 being effective to make a continuous record of the ionization current within the combustion chamber 411 which is a function of the concentration of the BSP in the aerosol mixture introduced thereinto via the capillary tube 470. The conductors 148 and 149 are also connected to an agent inhaled integrator 153, and more particularly, to the input terminals 154 and 155 thereof, the integrator 153 being effective to integrate the electrical signal with respect to time and to provide an output on the output terminals 156 and 157 which is supplied to an agent inhaled counter 158 of the digital type which is operative to make a numerical count that is a function of the amount of BSP in the aerosol mixture admitted into the combustion chamber 411 via the capillary tube 470. Other inputs to the integrator 153 and the counter 158 are from the main conductors 109 and 110 which provide operating potential thereto.

There further is provided an agent exhaled electrometer 160 having power input terminals 161 and 162 connected respectively to the main power conductors 109 and 110. A second pair of terminals 163 and 164 is provided, these terminals being connected to the electrodes in the combustion chamber 421, the terminal 163 being connected by the grounded conductor 103 to the conductor 489 connected to the screen electrode 487 and the other terminal 164 being connected by the conductor 488 to the ring electrode 486, the output terminal 164 having a negative 300 volt D.C. potential thereon which is derived from a high voltage battery within the electrometer 160 and is applied to the ring electrode 486. The electrometer 160 also may be, for example, that sold by Research Specialties Co. (Model No. 605–3) which can detect very small current flows between the ring electrode 486 and the screen electrode 487 caused by the ionization of gases and other materials passing through the hydrogen flame 447, the electrometer 160 being capable of detecting currents on the order of $10^{-14}$ ampere, and having a response time of a fraction of a second.

The ionization current detected between the electrodes 486 and 487 is amplified within the electrometer 160 and an output electrical signal that is a function of the ionization within the combustion chamber 421 appears as an output on terminals 166 and 167 which are connected to conductors 168 and 169, respectively, that convey the output signal to other components of the system. More specifically, the conductors 168 and 169 are connected to an agent exhaled recorder 170, and more specifically, to the input terminals 171 and 172 thereof, respectively, the recorder 170 being effective to make a continuous record of the ionization current within the combustion chamber 421 which is a function of the concentration of the BSP in the aerosol stream within the pipe 326 that is exhaled by the patient thereinto.

Means is provided to produce an electrical signal that is a function of the difference between the concentration of the BSP in the inhaled stream within the pipe 316 and the concentration of the BSP in the exhaled stream within the pipe 326; more specifically, a difference circuit 173 has been provided having four input terminals 173*a*, 173*b*, 173*c*, and 173*d* connected respectively to the conductors 149, 148, 169 and 168 so that the electrical signal from the electrometer 140 that is a function of the concentration of the BSP in the inhaled stream is applied between the terminals 173*a* and 173*b*, and so that the electrical signal from the electrometer 160 that is a function of the concentration of the BSP in the exhaled stream is applied between the terminals 173*c* and 173*d*. There further is applied to the difference circuit 173 operating potential from the main conductors 109 and 110, this potential being applied at terminals 173*e* and 173*f*. The output from the difference circuit 173 is an electrical signal that is a function of the difference between the concentration of the BSP in the inhaled stream and the concentration of the BSP in the exhaled stream and therefore a function of the amount of the BSP retained by the patient. This output electrical signal appears on output terminals 176 and 177, respectively. A continuous record of the amplitude of the difference electrical signal is made by a difference recorder 178 having input terminals 178*a* and 178*b* connected to the conductors 176 and 177, respectively. The difference electrical signal further is utilized as an input to an agent retained integrator 180, and more specifically, to the input terminals 181 and 182 thereof which are connected respectively to the conductors 176 and 177, a second input to the integrator 180 being from the main line conductors 109 and 110 which connect to power input terminals 183 and 184, respectively. The integrator 180 serves to integrate the difference signal with respect to time and provides an output at the terminals 185 and 186 which connect respectively with conductors 187 and 188. The electrical signal on the conductors 187 and 188 is applied to an agent retained counter 190, and more specifically, to input terminals 191 and 192 which are connected respectively to the conductors 187 and 188; operating power is also supplied to the counter 190 from the conductors 109 and 110 which are connected to input terminals 193 and 194 thereof. The counter 190 is effective to produce a digital record of the BSP retained by the patient and more specifically, a record of the difference between the amount or concentration of the BSP in the inhaled stream within the pipe 316 and the concentration of the BSP in the exhaled stream within the pipe 326.

Both the agent inhaled counter 158 and the agent retained counter 190 operate only during the inhalation portion of the breathing cycle under the control of the electrical co-ordinating signal appearing on the conductors 357 and 358 and derived from the air inhaled recorder. More specifically, the conductors 357 and 358 are connected respectively to input terminals 159*a* and 159*b* of the counter 158 and the conductors 357 and 358 are also connected to input terminals 199*a* and 199*b* of the agent retained counter 190. The co-ordinating signal from the air inhaled recorder 350 appearing on the conductors 357 and 358 is produced when the flow meter 330 indicates a positive flow of air therethrough which is somewhat greater than the background or noise level of the instrument and system, and for example, approximately 5% of the full scale movement of the air inhale recorder 350; the co-ordinating signal upon the conductors 357 and 358 continuing so long as air is being inhaled through the flow meter 330 and until the volume of the air inhaled through the flow meter 330 falls below a predetermined value, such as the value which initiates the co-ordinating signal or a value corresponding to about 5% of the full scale movement of the air inhale recorder 350. As soon absence of a co-ordinating signal upon the conductors 357 and 358, the agent inhaled counter 158 and the agent retained counter 190 begin to operate, and in the absence of a co-ordinating signal upon the conductors 357 and 358, the counters 158 and 190 do not operate even though signals are being received from the respective integrators 153 and 180.

The totalizing circuit 370 in FIG. 3 is provided to produce a more accurate and more positive indication of the total dosage of the inhaled agent such as BSP which is given to the patient. A total dosage circuit 371 is provided to which is applied the difference electrical signal which is a function of a difference between the concentration of the BSP in the inhale stream within the pipe 316 and the concentration of the BSP in the exhale stream within the pipe 326 and an electrical signal that is a function of the volume of aerosol mixture inhaled through the flow meter 330, the total dosage circuit being operative to combine these signals to produce yet another electrical signal that is a function of the absolute amount of BSP retained by the patient.

The conductors 176 and 177 carrying the difference electrical signal and the conductors 348 and 349 carrying the air inhaled electrical signal are connected to the input connections of a four blade switch 372 which is effective when closed to connect the conductors 177, 176, 348 and 349, respectively, to conductors 373, 374, 375 and 376 which in turn connect respectively to input terminals 373a, 374a, 375a and 376a of the total dosage circuit 371. A second input to the total dosage circuit 371 is operating potential from the main line conductors 109 and 110 which is applied through input terminals 377a and 377b. The output from the circuit 371 appears on the output terminals 378 and 379 which are connected respectively to the conductors 378a and 379a, the output from the circuit 371 being an electrical signal that is a function of the absolute amount of BSP retained by the patient.

An output from the total dosage circuit 371 is applied to a total dosage recorder 380, and more specifically, the conductors 378a and 379a are connected respectively to input terminals 381 and 382 of the recorder 380, another input thereto being operating potential from the main line conductors 109 and 110 which is applied to input terminals 383 and 384. The recorder 380 is operative to make a continuous recording of the dosage of BSP given to the patient. The output from the total dosage circuit 370 is further connected to a total dosage integrator 385 and more specifically, the conductors 378a and 379a are connected to input terminals 386a and 386b, respectively, and a second input to the total dosage integrator 385 is operating potential from the conductors 109 and 110 which is applied thereto through input terminals 387a and 387b. The integrator 385 is operative to integrate the electrical signal from the total dosage circuit signal with respect to time and the output therefrom appears on the output terminals 388 and 389 which are connected to a total dosage counter 390. More specifically, the total dosage counter 390 has input terminals 391 and 392 which are connected by conductors 393 and 394, respectively, to the output terminals 388 and 389 of the integrator 385. A second input to the total dosage counter 390 is operating potential from the conductors 109 and 110, the operating potential being applied through input terminals 395 and 396 connected to the conductors 109 and 110, respectively. The total dosage counter 390 is also under the control of the co-ordinating signal appearing on the conductors 357 and 358 and these conductors are connected to the counter 390, respectively, through input terminals 397 and 398. The total dosage counter 390 is operative to provide a digital indication of the total dosage of BSP given to the patient, the dosage of BSP given to the patient being continuously and accurately presented by the counter 390.

The electrical currents flowing between the electrodes 476 and 477 and between the electrodes 486 and 487 in the hydrogen flame ionization detector 400 are very small and in order to minimize interference with the detection and subsequent measuring and recording thereof, the entire detector 400 is completely enclosed within an electrostatic shield diagrammatically represented at 419 which is grounded by connection to the grounded conductor 103, the shield 419 being formed of a highly conductive material such as aluminum metal so as to shield the detector 400, and particularly the electrical components thereof, from extraneous electrical fields. It further will be understood that the various conductors connected to the detector 400 and particularly the conductors 478 and 488 interconnecting the detector 400 and the electrometers 140 and 160 are also shielded so as to prevent pick-up thereby of currents from stray fields existing in the vicinity thereof.

A detailed description of the operation of the inhalation aerosol dosimeter will now be given. First the various gas and water connections are made as described above and the main line switches 107 and 108 are then closed. This immediately begins operation of the vacuum pump 560 to draw air from the combustion chambers 411 and 421 through the various chambers of the vacuum and sampling system 500, and particularly through the cooling chamber 502, the ballast chamber 512 the flow meter 520, the low vacuum chamber 532 and the high vacuum chamber 552 and out the pump exhaust 562. The pressure within the system will quickly drop below atmospheric pressure and hydrogen gas will be drawn into the combustion chambers 411 and 412 and the oxygen containing gas will also be drawn into the combustion chambers 411 and 421 to provide a combustible mixture, which when ignited, will produce the flames 437 and 447. In order to ignite the combustible mixture within the combustion chambers, the start switches 120 and 121 (see FIG. 1) are momentarily closed to heat the igniter wires 473 and 483; the igniter wires 473 and 483 rapidly reach a temperature sufficient to ignite the combustible mixture and to establish the flames 437 and 447, the switches 120 and 121 being opened as soon as the flames have been established.

It further will be noted that the heater 406 will be operating at this time under the control of the transformer 130 and the thermostat 409 which will now be closed since the housings 410 and 420 will be cold. The electrical power is also supplied through the conductors 109 and 110 to the other electrical components including the electrometers 140 and 160, the recorders 150 and 170, the integrator 153, the counter 158, the difference circuit 173, the difference recorder 178, the integrator 180, the counter 190, the flow meter 330, the amplifier 341, the recorder 350, the integrator 360, the counter 367, the total dosage circuit 371, the total dosage recorder 380, the integrator 385, and the total dosage counter 390.

The generator 301 is also energized from the conductors 109 and 110 to provide a mixture of BSP in aerosol form in air within the pipe 310. Before measuring the concentrations of the aerosol in the pipes 316 and 326, it is necessary to balance and match the two detector chambers within the detector 400. If the air valve 305 is closed so that no aerosol is injected into the combustion chambers 411 and 421, there will be sufficient ionization within the hydrogen flames 437 and 447 to cause a current to flow between the associated electrodes having a magnitude on the order of about $10^{-12}$ ampere, which current represents background noise, the resistance of the hydrogen flame being on the order of $10^{-14}$ ohms. The background noise is maintained at a minimum value if the pressure of the hydrogen gas entering the burners 430 and 440 and the combustion chambers 411 and 421 is maintained constant, any variation of the rate of feed of hydrogen gas thereinto creating substantial background noise and therefore limiting the sensitivity of the detectors; for this reason the precise vacuum control provided by the system 500 has been incorporated in the dosimeter of the present invention.

If an organic material such as BSP is now introduced into the hydrogen flames 437 and 447 by opening the valve 305, the ionization within the flames is substantially increased to cause a corresponding increase in the current flow between the associated electrodes, this increase in current flow being detected by the electrometers 140 and 160. The manner in which even very minute traces of organic materials substantially increases the ionization within the flames 437 and 447 is not fully understood, but it is believed that the organic compounds have smaller ionization potentials than the inorganic gases present in the flames, and further that particles of carbon formed in the flames have a small work function and thus supply a large number of electrons to the flames to permit substantial ionization thereby with a resultant substantial flow of current between the associated electrodes. In any event, the introduction of even small amounts of organic materials, such as a few micrograms of BSP per liter of air, can be detected, and even smaller amounts can be detected of even less than one microgram of BSP per liter of air.

In order to match and calibrate the detectors within the chambers 411 and 421, it is necessary to introduce identical aerosol samples thereinto, i.e., samples having identical concentrations of BSP, and to this end a manually operable bellows (not shown) may be attached in place of the mask 321 and operated to provide identical aerosol samples in the pipes 316 and 326 which are then fed into the combustion chambers 411 and 421 through the capillary tubes 470 and 480, respectively. With identical gas samples entering the detectors, the outputs from the electrometers 140 and 160 should be identical and identical readings should be obtained upon the associated recorders 150 and 170. If the outputs from the detectors are not identical then operation thereof must be slightly altered such as by altering the flow of hydrogen gas thereto or by altering the spacing of electrodes therein, or alternatively the electrometers must be adjusted until the outputs thereof are identical when identical gas samples are introduced into the combustion chambers 411 and 421.

Having matched and adjusted the detectors, the dosimeter is now in condition to be used and the face mask 320 is fitted upon the face of the patient to cover his nose and mouth. The BSP or aerosol from the pipe 310 is fed directly through the T-coupling 311 to the pipe 316 which is continuously sampled through the capillary tube 470 into the combustion chamber 411 so as to provide a continuous measurement of the concentration of the BSP in the stream to be inhaled by the patient, the ionization of the sample and of the other gases within the chamber 411 producing a flow of electrical current between the electrodes 476 and 477 which is connected via the conductors 478 and 479 to the agent inhaled electrometer 140.

As the patient inhales from the face mask 320 and into his respiratory system, the aerosol within the pipe 310 is drawn through the flow meter 330 and past the valve 323 which closes the pipe 326. As soon as the patient begins to inhale, the flow meter 330 produces an output signal on the conductors 337 and 338 which is applied to the input of the amplifier 341, the output of the amplifier 341 being applied as the input to the air inhaled recorder 350. As the patient exhales, the flow of aerosol through the flow meter 330 drops to zero, the valve 323 has the position thereof reversed to connect the pipe 326 with the face mask 320', the exhaled air stream enters the pipe 326 and is exhausted to the atmosphere. This process of breathing through the flow meter 330, the valve 323 and the mask 320 is repeated until the desired dosage has been given to the patient.

The gas mixture within the pipe 326 is continuously sampled through the capillary tube 480 and into the combustion chamber 421, and there is generated between the electrodes 486 and 487 an electrical current which is a function of the concentration of BSP in the gas sample. The current detected by the electrodes is applied through the conductors 488 and 489 as an input to the agent exhaled electrometer 160 which produces as an output therefrom an electrical signal that is a function of the concentration of the BSP in an exhaled gas stream, the electrical signal being continuously recorded by the agent exhaled recorder 170.

The outputs from the electrometers 140 and 160 in addition to being applied to the agent inhaled recorder 150 and the agent exhaled recorder 170, respectively, is further applied to the difference circuit 173 which produces another electrical signal which is a function of the difference between the concentration of the BSP in the inhaled air stream within the pipe 316 and the concentration of BSP in the exhaled air stream within the pipe 328. This difference electrical signal is recorded by the difference recorder 178.

The integrators and counters have also been provided to make a digital presentation of the agent (BSP) inhaled by the patient and the agent (BSP) retained by the patient. More specifically, the output from the agent inhaled electrometer 140 is further applied to the agent inhaled integrator 153 which integrates the electrical signal and applies it to the agent inhaled counter 158. Likewise the output from the difference circuit 173 in the form of a difference electrical signal is applied to the agent retained integrator 180 which integrates the electrical signal with respect to time and applies it to the agent retained counter 190 through the conductors 187 and 188.

In accordance with the present invention the counters 158 and 190 are actuated only during inhalation by the patient, the control of the counters being accomplished by the co-ordinating electrical signal derived from the air inhaled recorder 350 on the conductors 357 and 358, the co-ordinating electrical signal being present on the conductors 357 and 358 after inhalation has been begun and detected by the flow meter 330 and until the inhalation has substantially stopped, at which time the co-ordinating signal is removed from the conductors 357 and 358 and the counters 153 and 190 are rendered inoperative. Accordingly, the counter 153 records the concentration of the agent in the stream being breathed by the patient in the pipe 316 and the counter 190 records the difference between the concentration of the agent in the stream being breathed by the patient in the pipe 316 and the concentration of the agent in the stream exhaled by the patient into the pipe 326 at the end of the preceding respiratory cycle.

The totalizing circuit 370 further serves to provide an indication of the total amount of agent retained by the patient or the dosage of the agent given to the patient. More particularly, upon closure of the switch 372, both the difference electrical signal from the difference circuit 173 and the air inhaled electrical signal from the amplifier 341 are applied as inputs to the total dosage circuit 371 which produces as an output therefrom an electrical signal corresponding to the amount of agent (BSP) retained by the patient. The output of the total dosage circuit 371 is applied both to the recorder 380 via the conductors 378a and 379a and to the total dosage integrator 385. The recorder 380 makes a continuous record of the dosage to the patient. The output of the total dosage integrator 385 is applied to the total dosage counter which is under the control of the co-ordinating signal appearing on the conductors 357 and 358 and serves to provide a digital indication of the total dosage of the agent (BSP) given to the patient.

It will be seen that there has been provided an improved inhalation aerosol dosimeter and an improved method of measuring the dosage of an agent to a patient which fulfills all of the objects and advantages set forth above. More particularly there has been provided a dosimeter which continuously and simultaneously measures the input concentration of an agent, such as BSP, in an input or inhalation gas stream to a patient and the output concentration of the agent in the output or exhalation gas stream from the patient. The detectors used in the dosimeter and the associated electrical network have a very short time of response on the order of a fraction of a second and, accordingly, the dosimeter can be used continuously to measure samples that vary substantially in composition. The matched detectors in the dosimeter operating at subatmospheric pressure provide very sensitive detection and measurement of the agent being administered to the patient and provide as outputs therefrom electrical signals that are readily utilized to make a permanent recording or a digital indication of the amount of agent in the air inhaled by the patient, the amount of agent retained by the patient and if desired the total dosage of the agent given to the patient. Furthermore, the face mask and associated structure for administering the agent to the patient has a minimum dead air volume so that the measurements made of the inhalation air stream and the exhalation air stream are meaningful. In addition improved detection of the agent is provided by utilizing as the oxygen contaning gas supplied to the hydrogen flame ionization burners a mixture containing about 90% nitrogen by volume and about 10% oxygen by volume thereby to minimize the effect of the difference between the gas composition of the inhalation gas stream and the gas composition of the exhalation gas stream and particularly the differences in the oxygen and carbon dioxide contents thereof.

While there has been described what is at present considered to be the preferred embodiment of the invention, it will be undrstood that various modifications may be made therein, and it is intended to cover in the appended claims all such modifications as fall within the true spirit and scope of the invention.

What is claimed is:

1. In apparatus for continuously and simultaneously measuring the input concentration of an agent in the input gas stream to a processing station and the output concentration of the agent in the output gas stream from the processing station, the combination comprising a first housing defining a first closed detecting chamber and having a first inlet connecting with the input gas stream for introducing a first gas sample into said first detecting chamber and a first outlet for removing gases therefrom, a first hydrogen flame ionizing unit within said first detecting chamber for ionizing at least a portion of the first gas sample introduced thereinto, means for supplying fuel to said first ionizing unit, first means for measuring the ionization of the gases within said first detecting chamber, a second housing defining a second closed detecting chamber and having a second inlet connecting with the output gas stream for introducing a second gas sample into said second detecting chamber and a second outlet for removing gases therefrom, a second hydrogen flame ionizing unit within said second detecting chamber for ionizing at least a portion of the second gas sample introduced thereinto, means for supplying fuel to said second ionizing unit, second means for measuring the ionization of the gases within said second detecting chamber, a third housing defining a closed cooling chamber and having an inlet connection communicating therewith and connected both to said first outlet and to said second outlet and having an outlet connection communicating with said cooling chamber for removing gases therefrom, means within said cooling chamber for cooling and condensing a portion of the condensable gases passing thereinto, a fourth housing defining a closed ballast chamber and having an inlet conduit connected to said outlet connection and an outlet conduit for removing gases from said ballast chamber, a flow meter for measuring the rate of flow of gases and having an inlet tube connected to said outlet conduit and an outlet tube for removing gases from said flow meter, a fifth housing defining a closed relatively low vacuum chamber and having a first inlet passage communicating therewith and connected to said outlet tube and having a second inlet passage communicating with said low vacuum chamber and having an outlet passage communicating with said low vacuum chamber for removing gases therefrom, a sixth housing defining a closed relatively high vacuum chamber and having an inlet pipe communicating therewith and connected to said outlet passage and having an outlet pipe communicating with said high vacuum chamber for removing gases therefrom, a source of subatmospheric pressure having a relatively low pressure and connected to said outlet pipe, a source of gas having a relatively high pressure, a pressure regulator having an inlet thereto connected to said source of high pressure gas and an outlet therefrom, said regulator passing gas from the inlet thereof to the outlet thereof upon demand at a predetermined pressure in said regulator outlet intermediate said relatively low pressure and said relatively high pressure, and means interconnecting said second inlet passage and said regulator outlet, said regulator maintaining the pressure in said low vacuum chamber at said predetermined value between said relatively high pressure and said relatively low pressure and thus to maintain the same predetermined pressure in both said detecting chambers and a predetermined rate of flow of the first and second gas samples respectively thereinto and past said ionizing means, whereby continuously and simultaneously to measure the input concentration of the agent in the input gas stream to the processing station and the output concentration of the agent in the output gas stream from the processing station.

2. In apparatus for continuously and simultaneously measuring the input concentration of an agent in the input gas stream to a processing station and the output concentration of the agent in the output gas stream from the processing station, the combination comprising a first housing defining a first closed detecting chamber and having a first inlet connecting with the input gas stream for introducing a first gas sample into said first detecting chamber and a first outlet for removing gases therefrom, a first hydrogen flame ionizing burner in said first detecting chamber, means for supplying hydrogen gas and an oxygen containing gas to said first burner, first means for measuring the ionization of the gases within said first detecting chamber, a second housing defining a second closed detecting chamber and having a second inlet connecting with the output gas stream for introducing a second gas sample into said second detecting chamber and a second outlet for removing gases therefrom, a second hydrogen flame ionizing burner in said second detecting chamber, means for supplying hydrogen gas and an oxygen containing gas to said second burner, second means for measuring the ionization of the gases within said second detecting chamber, including a common casing disposed about both said first housing and said second housing, and a quantity of heat-insulating material disposed between said casing and said housings for maintaining said detecting chambers at the same temperature, a source of subatmospheric pressure connected both to said first outlet and to said second outlet for continuously drawing the first and second gas samples respectively into said first and second detecting chambers through said inlets and past said ionizing means and from said outlets, an electrical heater thermally coupled to said detecting chambers for heating both said detecting chambers independently of said burners, and control means for said heater operable to maintain both of said chambers at a predetermined elevated temperature to minimize the condensation of gases therein, whereby continuously and simultaneously to measure the input concentration of the agent in the input gas stream to the processing station and the output concentration of the agent in the output gas stream from the processing station.

3. In apparatus for continuously and simultaneously measuring the input concentration of an agent in the input gas stream to a processing station and the output concentration of the agent in the output gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is the function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, means for continuously measuring the volume of the input gas stream to the processing station and for generating a third electrical signal that is a function of the volume of the input gas stream to the processing station, and indicator means coupled to said first and second detecting means and to said volume measuring means for receiving said first and second and third signals therefrom to indicate the concentrations of the agent in the streams and the volume of the input gas stream, whereby continuously and simultaneously to measure the input concentration of the agent in the input gas stream to the processing station and the output concentration of the agent in the output gas stream from the processing station and the volume of the input gas stream to the processing station.

4. In apparatus for continuously and simultaneously measuring and recording the input concentration of an agent in the input gas stream to a processing station and the output concentration of the agent in the output gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is the function of the concentration of the agent in the input gas stream, a first recorder connected to said first detecting means for recording said first electrical signal, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a second recorder connected to said second detector means for recording said second electrical signal, a source of subatmospheric pressure connected both to said first outlet and to said second outlet for continuously drawing the first and second gas samples respectively into said detecting chambers through said inlets and past said ionizing means and from said outlets, means for continuously measuring the volume of the input gas stream to the processing station and for generating a third electrical signal that is a function of the volume of the input gas stream to the processing station, and a third recorder connected to said measuring means for recording said third electrical signal, whereby continuously and simultaneously to measure and to record the input concentration of the agent in the input gas stream to the processing station and the output concentration of the agent in the output gas stream from the processing station and the volume of the input gas stream to the processing station.

5. In apparatus for continuously and simultaneously measuring the difference between the input concentration of an agent in the input gas stream to a processing station and the output concentration of the agent in the output gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is the function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the processing station and the input concentration of the agent in the input gas stream to the processing station, means for continuously measuring the volume of the input gas stream to the processing station and for generating a fourth electrical signal that is a function of the volume of the input gas stream to the processing station, and indicator means coupled to said difference circuit and said volume measuring means for receiving said third and fourth signals therefrom to indicate the amount of agent retained at the processing station.

6. In apparatus for continuously and simultaneously measuring and recording the difference between the input concentration of an agent in the input gas stream to a processing station and the output concentration of the agent in the output gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a first recorder connected to said first detecting means for recording said first electrical signal, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the processing station and the input concentration of the agent in the input gas stream to the processing station, a second recorder connected to said second detecting means for recording said second electrical signal, means for continuously measuring the volume of the input gas stream to the processing station and for generating a fourth electrical signal that is a function of the volume of the input gas stream to the processing station, a third recorder connected to said measuring means for recording said fourth electrical signal, and indicator means coupled to said difference circuit and said volume measuring means to receive said third and fourth signals therefrom to indicate the amount of agent removed from the input stream at the processing station.

7. In apparatus for continuously and simultaneously measuring the difference between the input concentration of an agent in the input gas stream to a processing station and the output concentration of the agent in the output gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a first integrating and counting circuit connected to said first detecting means for integrating said first electrical signal with respect to time to provide a counter output that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the processing station and the input concentration of the agent in the input gas stream to the processing station, a second integrating and counting circuit connected to said difference circuit for integrating said third electrical signal with respect to time to provide a counter output that is a function of the difference between the output concentration of the agent in the output gas stream from the processing station and the input concentration of the agent in the input gas stream to the processing station, means for continuously measuring the volume of the input gas stream to the processing station and for generating a fourth electrical signal that is a function of the volume of the input gas stream to the processing station, a third integrating and counting circuit connected to said measuring means for integrating said fourth electrical signal with respect to time to provide a counter output that is a function of the volume of the input gas stream to the processing station, and indicator means coupled to said difference circuit and said volume measuring means for receiving the signals therefrom to indicate the amount of the agent removed from the input stream at the processing station.

8. In apparatus for continuously and simultaneously measuring and recording the difference between the input concentration of an agent in the input gas stream to a processing station and the output concentration of the agent in the input gas stream from the processing station and the volume of the input gas stream to the processing station, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a first recorder connected to said first detecting means for recording said first electrical signal, a first integrating and counting circuit connected to said first detecting means for integrating said first electrical signal with respect to time and to provide a counter output that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is the function of the concentration of the agent in the output gas stream, a second recorder connected to said second detecting means for recording said second electrical signal, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the processing station and the input concentration of the agent in the input gas stream to the processing station, a third recorder connected to said difference circuit for recording said third electrical signal, a second integrating and counting circuit connected to said difference circuit for integrating said third electrical signal with respect to time and to provide a counter output that is a function of the difference betwee nthe output concentration of the agent in the output gas stream from the processing station and the input concentration of the agent in the input gas stream to the processing station, means for continuously measuring the volume of the input gas stream to the processing station and for generating a fourth electrical signal that is a function of the volume of the input gas stream to the processing station, a fourth recorder connected to said measuring means for recording said fourth electrical signal, a third integrating and counting circuit connected to said measuring means for integrating said fourth electrical signal with respect to time and to provide a counter output that is a function of the volume of the input gas stream to the processing station, and indicator means coupled to said difference circuit and said volume measuring means for receiving the signals therefrom to indicate the amount of the agent removed from the input stream at the processing station.

9. In apparatus for continuously measuring the amount of an agent retained at a processing station having an input gas stream thereto containing the agent and an output gas stream therefrom, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, means for continuously measuring the volume of the input gas stream to the processing station and for generating a third electrical signal that is a function of the volume of the input gas stream to the processing station, totalizing means connected to said first detecting means and said second detecting means and said measuring means for generating a fourth electrical signal that is a function of the amount of the agent retained at the processing station, and indicator means coupled to said totalizing means for receiving said fourth signal therefrom to indicate the amount of the agent retained at the processing station.

10. In apparatus for continuously measuring the amount of an agent retained at a processing station having an input gas stream thereto containing the agent and an output gas stream therefrom, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, means for continuously measuring the volume of the input gas stream to the processing station and for generating a third electrical signal that is a function of the volume of the input gas stream to the processing station, totalizing means connected to said first detecting means and said second detecting means and said measuring means for generating a fourth electrical signal that is a function of the amount of the agent retained at the processing station, and a recorder connected to said totalizing means for recording said fourth electrical signal.

11. In apparatus for continuously measuring the amount of an agent retained at a processing station having an input gas stream thereto containing the agent and an output gas stream therefrom, the combination comprising a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is a function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal threrefrom and being operative to produce a third electrical signal that is a function of the difference between the output concentration of the agent in the output gas stream from the processing station and the input concentration of the agent in the input gas stream to the processing station, and means for continuously measuring the volume of the input gas stream to the processing station and for generating a fourth electrical signal that is a function of the volume of the input gas stream to the processing station, totalizing means connected to said difference circuit and said measuring means for generating a fifth electrical signal that is a function of the amount of the agent retained at the processing station, and indicator means coupled to said totalizing means for receiving said fifth electrical signal therefrom to indicate the amount of the agent retained at the processing station.

12. A dosimeter for measuring the amount of an agent retained by a patient from a gas stream containing the agent, comprising means for establishing an input gas stream containing the agent to be measured, means for supplying at least a portion of the input gas stream to the patient, means for collecting said portion of the gas stream after contact with the patient to establish an output gas stream, a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for measuring the ionization of the gases within said first detecting chamber, a second housing defining a second closed detecting chamber and having a second inlet connecting with the output gas stream for introducing a second gas sample into said second detecting chamber and a second outlet for removing gases therefrom, second means within said second detecting chamber for ionizing at last a portion of the second gas sample introduced thereinto, second means for measuring the ionization of the gases within said second detecting chamber, a source of subatmospheric pressure connected both to said first outlet and to said second outlet for continuously drawing gas samples respectively into said detecting chambers through said inlets and past said ionizing means and from said outlets, and indicator means coupled to said ionization measuring means to indicate the amount of the agent in the streams, whereby continuously and simultaneously to measure the amount of the agent in both the input gas stream to and the output gas stream from the patient and thus the amount of the agent retained by the patient.

13. A dosimeter for measuring the amount of an agent retained by a patient from a gas stream containing the agent, comprising means for establishing an input gas stream containing the agent to be measured, means for supplying at least a portion of the input gas stream to the patient, means for collecting said portion of the gas stream after contact with the patient to establish an output gas stream, a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is the function of the concentration of the agent in the input gas stream, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, means for continuously measuring the volume of said portion of the input gas stream to the patient and for generating a third electrical signal that is a function of the volume of said portion of the input gas stream to the patient, and indicator means coupled to said first and second detecting means for receiving said first and second signals therefrom and to said volume measuring means for receiving said third signal therefrom to indicate the amount of the agent in the streams and the volume of the input gas stream, whereby continuously and simultaneously to measure the amount of the agent in both the input gas stream to and the output gas stream from the patient and the volume of the input gas stream to the patient and thus the amount of the agent retained by the patient.

14. A dosimeter for measuring the amount of an agent retained by a patient from a gas stream containing the agent, comprising means for establishing an input gas stream containing the agent to be measured, means for supplying at least a portion of the input gas stream to the patient, means for collecting said portion of the gas stream after contact with the patient to establish an output gas stream, a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is the function of the concentration of the agent in the input gas stream, a second housing defining a second closed detecting chamber and having a second inlet connecting with the output gas stream for introducing a second gas sample into said detecting chamber and a second outlet for removing gases therefrom, second means within said second detecting chamber for ionizing at least a portion of the second gas sample introduced thereinto, second mean for detecting the ionization of the gases within said second detecting chamber anrd for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said oulets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the patient and the input concentration of the agent in the input gas stream to the patient, mean for continuously measuring the volume of the input gas stream to the patient and for generating a fourth electrical signal that is a function of the volume of the input gas stream to the patient, and indicator means coupled to said difference circuit for receiving said third signal therefrom and connected to said volume measuring means for receiving said fourth signal therefrom to indicate the dosage of the agent retained by the patient, whereby continuously and simultaneously to measure the difference between the concentration of the agent in the input gas stream to the patient and the concentration of the agent in the output gas stream from the patient and the volume of the input gas stream to the patient and thus the amount of the agent retained by the patient.

15. A dosimeter for measuring and recording the amount of an agent retained by a patient from a gas stream containing the agent, comprising means for establishing an input stream containing the agent to be measured, means for supplying at least a portion of the input gas stream to the patient, means for collecting said portion of the gas stream after contact with the patient to establish an output gas stream, a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for detecting the ionization of the gases within said first detecting chamber and for generating a first electrical signal that is the function of the concentration of the agent in the input gas stream, a first recorder connected to said first detecting means for recording said first electrical signal, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for detecting the ionization of the gases within said second detecting chamber and for generating a second electrical signal that is a function of the concentration of the agent in the output gas stream, a source of subatmospheric pressure connected both to said first outlet and to said second outlet for continuously drawing the first and second gas samples respectively into said detecting chambers through said inlets and past said ionizing means and from said outlets, said first and second detecting chambers and said first and second ionizing means and said first and second detecting means being constructed and arranged so that said first and second electrical signals are substantially identical when identical gas samples are introduced into said detecting chambers, a difference circuit connected both to said first detecting means and to said second detecting means to receive said first electrical signal and said second electrical signal therefrom and being operative to produce a third electrical signal that is a function of the difference between the output concentration of the agent in the output gas stream from the patient and the input concentration of the agent in the input gas stream to the patient, a second recorder connected to said difference circuit for recording said third electrical signal, means for continuously measuring the volume of the input gas stream to the patient and for deenergizing a fourth electrical signal that is a function of the volume of the input gas stream to the patient, a third recorder connected to said measuring means for recording said fourth electrical signal, and indicator means coupled to said difference circuit for receiving said third signal therefrom and connected to said volume measuring means for receiving said fourth signal therefrom to indicate the dosage of the agent retained by the patient.

16. A dosimeter for measuring the amount of an agent retained by a patient from an air stream breathed by the patient and containing the agent, comprising means for establishing an input gas stream containing air and the agent to be measured, means for supplying at least a portion of the input gas stream to the patient as the total gas stream inhaled by the patient, means for collecting the exhaled gas stream from the patient to establish an output gas stream, a first housing defining a first closed detecting chamber and having a first inlet connecting with the input gas stream for introducing a first gas sample into said first detecting chamber and a first outlet for removing gases therefrom, first means within said first detecting chamber for ionizing at least a portion of the first gas sample introduced thereinto, first means for measuring the ionization of the gases within said first detecting chamber, a second housing defining a second closed detecting chamber and having a second inlet connecting with the output gas stream for introducing a second gas sample into said second detecting chamber and a second outlet for removing gases therefrom, second means within said second detecting chamber for ionizing at least a portion of the second gas sample introduced thereinto, second means for measuring the ionization of the gases within said second detecting chamber, the volume of said supplying means and said collecting means and the connections to said first and second housings being small relative to the volume of the output gas stream from the patient, and a source of subatmospheric pressure connected both to said first outlet and to said second outlet for continuously drawing gas samples respectively into said detecting chambers through said inlets and past said ionizing means and from said outlets, and indicator means connected to said first and second ionization measuring means to indicate the amount of the agent in the streams, whereby continuously and simultaneously to measure the amount of the agent in both the input gas stream to and the output gas stream from the patient and thus the amount of the agent retained by the patient.

17. A dosimeter for measuring the amount of an agent retained by a patient from an air stream breathed by the patient and containing the agent, comprising means for establishing an input gas stream containing air and the agent to be measured, means for supplying at least a portion of the input gas stream to the patient as the total gas stream inhaled by the patient, means for collecting the exhaled gas stream from the patient to establish an output gas stream, a first housing defining a first closed detecting chamber and having a first inlet connecting with the input gas stream for introducing a first gas sample into said first detecting chamber and a first outlet for removing gases therefrom, a first hydrogen flame ionizing burner in said first detecting chamber, means for supplying hydrogen gas and a mixture containing about 90% by volume nitrogen gas and about 10% by volume oxygen gas to said burner, first means for measuring the ionization of the gases within said first detecting chamber, a second housing defining a second closed detecting chamber and having a second inlet connecting with the output gas stream for introducing a second gas sample into said second detecting chamber and a second outlet for removing gases therefrom, a second hydrogen flame ionizing burner in said second detecting chamber, means for supplying hydrogen gas and a mixture containing about 90% nitrogen gas and about 10% oxygen gas to said second burner, second means for measuring the ionization of the gases within said second detecting chamber, the volume of said supplying means and said collecting means and the connections to said first and second housings being small relative to the volume of the output gas stream from the patient, a source of subatmospheric pressure connected both to said first outlet and to said second outlet for continuously drawing gas samples respectively into said detecting chambers through said inlets and past said ionizing means and from said outlets, and indicator means connected to said first and second ionization measuring means to indicate the amount of the agent in the streams, whereby continuously and simultaneously to measure the amount of the agent in both the input gas stream to and the output gas stream from the patient and thus the amount of the agent retained by the patient.

18. The method of continuously and simultaneously measuring the input concentration of an agent in an input gas stream to a processing station and the output concentration of an agent in the output gas stream from the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, and continuously and simultaneously measuring the ionization of the gases in said first gas sample and the ionization of the gases in said second gas sample, whereby continuously and simultaneously to measure the input concentration of the agent in the input gas stream to the processing station and the output concentration of the agent in the output gas stream from the processing station.

19. The method of continuously and simultaneously measuring the input concentration of an agent in an input gas stream to a processing station and the output concentration of an agent in the output gas stream from the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, and utilizing said first and second signals to indicate the concentration of the agent in the streams, whereby continuously and simultaneously to measure the input concentration of the agent in the input gas stream to the processing station and the output concentration of the agent in the output stream from the processing station.

20. The method of continuously and simultaneously measuring and recording the input concentration of an agent in an input gas stream to a processing station and the output concentration of an agent in the output gas stream from the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, recording said first electrical signal, continuously detecting the ionization of the gases in said second gas sample and generating a second electrical signal that is a function of the concentration of the agent in the output gas stream, and recording said second electrical signal, whereby continuously and simultaneously to measure and to record the input concentration of the agent in the input gas stream to the processing station and the output concentration of the agent and the output gas stream from the processing station.

21. The method of continuously and simultaneously measuring the difference between the input concentration of an agent in an input gas stream to a processing station and the output concentration of an agent in the output gas stream from the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the processing station and the input concentration of the agent in the input gas stream to the processing station, and utilizing said third signal to indicate the difference between the concentrations of the agent in the streams.

22. The method of continuously measuring and recording the difference between the input concentration of an agent in an input gas stream to a processing station and the output concentration of an agent in the output gas stream from the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, recording said first electrical signal, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the processing station and the input concentration of the agent in the input gas stream to the processing station, and recording said third electrical signal.

23. The method of continuously and simultaneously measuring the input concentration of an agent in the input gas stream to a processing station and the output concentration of the agent in the output gas stream from the processing station and the volume of the input gas stream to the processing station, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, continuously measuring the volume of the input gas stream to the processing station and generating a third electrical signal that is a function of the volume of the input gas stream to the processing station, and utilizing said first and second signals to indicate the concentration of the agent in the streams and utilizing said third signal to indicate the volume of the input gas stream.

24. The method of measuring the amount of an agent retained at a processing station having an input gas stream thereto containing the agent and an output gas stream therefrom, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the processing station and the input concentration of the agent in the input gas stream to the processing station, continuously measuring the volume of the input gas stream to the processing station and generating a fourth electrical signal that is a function of the volume of the input gas stream to the processing station, and utilizing said third and fourth signals to indicate the amount of the agent retained at the processing station.

25. The method of measuring and recording the amount of an agent retained at a processing station having an input gas stream thereto containing the agent and an output gas stream therefrom, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, recording said first electrical signal, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the processing station and the input concentration of the agent in the input gas stream to the processing station, recording said third electrical signal, continuously measuring the volume of the input gas stream to the processing station and generating a fourth electrical signal that is a function of the volume of the input gas stream to the processing station, recording said fourth electrical signal, and utilizing said third and fourth signals to indicate the amount of the agent retained at the processing station.

26. The method of measuring the amount of an agent retained at a processing station having an input gas stream thereto containing the agent and an output gas stream therefrom, comprising the steps of continuously withdrawing a first gas sample from the input gas stream under a predetermined subatmospheric pressure, continuously ionizing at least a portion of the first gas sample, continuously withdrawing a second gas sample from the output gas stream under said pretermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream continuously measuring the volume of the input gas stream to the processing station and generating a third electrical signal that is a function of the volume of the input gas stream to the processing station, combining said first and second and third electrical signals and generating a fourth electrical signal that is a function of the amount of the agent retained at the processing station, and utilizing said fourth signal to indicate the amount of the agent retained at the processing station.

27. The method of measuring the amount of an agent retained at a processing station having an input gas stream thereto containing the agent and an output gas stream therefrom, comprising the steps of continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the processing station and the input concentration of the agent in the input gas stream to the processing station, continuously measuring the volume of the input gas stream to the processing station and generating a fourth electrical signal that is a function of the volume of the input gas stream to the processing station, combining said third electrical signal and said fourth electrical signal and generating a fifth electrical signal that is a function of the amount of the agent retained at the processing station, and utilizing said fifth signal to indicate the amount of the agent retained at the processing station.

28. The method of measuring the amount of an agent retained by a patient from a gas stream containing the agent, comprising the steps of establishing an input gas stream containing the agent, supplying at least a portion of the input gas stream to the patient, collecting said portion of the gas stream after contact with the patient to establish an output gas stream, continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, and utilizing said first and second signals to indicate the concentrations of the agent in the streams.

29. The method of measuring the amount of an agent retained by a patient from a gas stream containing the agent, comprising the steps of establishing an input gas stream containing the agent, supplying at least a portion of the input gas stream to the patient, collecting said portion of the gas stream after contact with the patient to establish an output gas stream, continuously withdrawing a first gas sample from the input gas stream under a predetermined subatmospheric pressure, continuously ionizing at least a portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, continuously measuring said portion of the input gas stream to the patient and generating a third electrical signal that is a function of the volume of said portion of the input gas stream to the patient, and utilizing said first and second signals to indicate the concentrations of the agent in the streams and utilizing said third signal to indicate the volume of the input gas stream to the patient.

30. The method of measuring the amount of an agent retained by a patient from a gas stream containing the agent, comprising the steps of establishing an input gas stream containing the agent, supplying at least a portion of the input gas stream to the patient, collecting said portion of the gas stream after contact with the patient to esablish an output gas stream, continuously withdrawing a first gas sample from the input gas stream under a predetermined subatmospheric pressure, continuously ionizing at least at portion of the first gas sample, continuously withdrawing a second gas sample from the output gas stream under said predetermined subatmospheric pressure, continuously ionizing at least a portion of the second gas sample, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, combining said first electrical signal and said second electrical signal to generate a third electrical signal that is a function of the difference between the output concentration of the agent in the output gas stream from the patient and the input concentration of the agent in the input gas stream to the patient, continuously measuring the volume of that portion of the input gas stream to the patient and generating a fourth electrical signal that is a function of the volume of that portion of the input gas stream to the patient, and utilizing said third and fourth signals to indicate the amount of the agent retained by the patient from the gas stream.

31. The method of measuring the amount of an agent retained by a patient from a gas stream containing the agent, comprising the steps of establishing an input gas stream containing the agent, supplying at least a portion of the input gas stream to the patient, collecting said portion of the gas stream after contact with the patient to establish an output gas stream, continuously withdrawing a first gas sample from the input gas stream under a predetermined subatmospheric pressure, continuously ionizing at least a portion of the first gas sample in a hydrogen flame obtained by burning hydrogen gas and a mixture containing about 90% by volume nitrogen gas and about 10% by volume oxygen gas, continuously withdrawing a second gas sample from the output gas stream under said predetermined subatmospheric pressure, continuously ionizing at least a portion of the second gas sample in a hydrogen flame obtained by burning hydrogen gas and a mixture containing about 90% by volume nitrogen gas and about 10% by volume oxygen gas, continuously detecting the ionization of the gases in said first gas sample and generating a first electrical signal that is a function of the concentration of the agent in the input gas stream, continuously detecting the ionization of the gases in said second gas sample and generating a second electrical signal that is a function of the concentration of the agent in the output gas stream, combining said first electrical signal and said second electrical signal to generate a third electrical signal that is a function of the amount of the agent retained by the patient, and utilizing said third signal to indicate the amount of the agent retained by the patient.

References Cited

UNITED STATES PATENTS

| | | | |
|---|---|---|---|
| 2,393,650 | 1/1946 | Metcalf | 73—26 XR |
| 2,400,923 | 5/1946 | Farr et al. | |
| 2,437,720 | 3/1948 | Ackley | 73—26 XR |
| 2,639,610 | 5/1953 | Anderson | 73—27 |
| 2,949,345 | 8/1960 | Clauss. | |
| 3,006,339 | 10/1961 | Smith | 128—191 |
| 3,095,278 | 6/1963 | Green. | |
| 3,241,922 | 3/1966 | Walisch | 73—27 XR |

WILLIAM E. KAMM, Primary Examiner

U.S. Cl. X.R.

23—232, 255; 73—26